Figure 1:
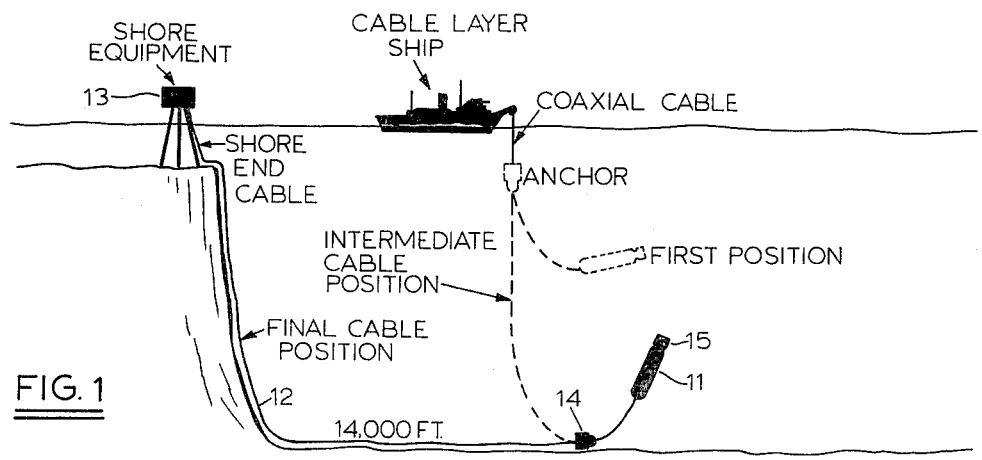

March 8, 1966  F. OSWALD  3,239,800
UNDERWATER ELECTRICAL EQUIPMENT
Filed Sept. 3, 1963  4 Sheets-Sheet 1

FRED OSWALD
INVENTOR.

BY *George B. Oujevolk*

ATTORNEY

FRED OSWALD
INVENTOR.

ATTORNEY

March 8, 1966 F. OSWALD 3,239,800
UNDERWATER ELECTRICAL EQUIPMENT
Filed Sept. 3, 1963 4 Sheets-Sheet 3

FRED OSWALD
INVENTOR.

BY George B. Oujevolk
ATTORNEY

March 8, 1966  F. OSWALD  3,239,800
UNDERWATER ELECTRICAL EQUIPMENT
Filed Sept. 3, 1963  4 Sheets-Sheet 4
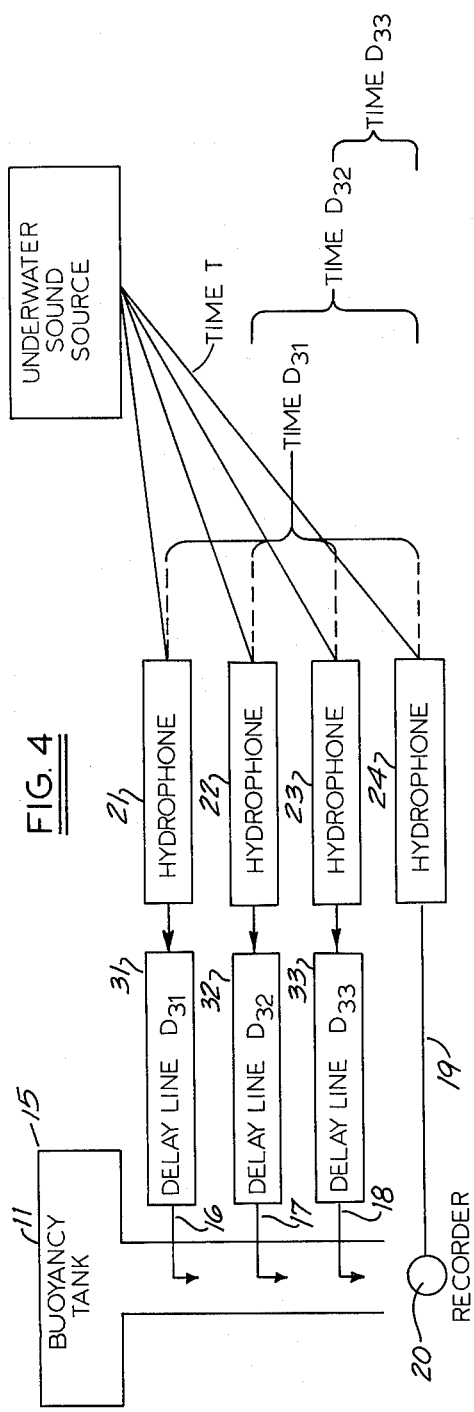
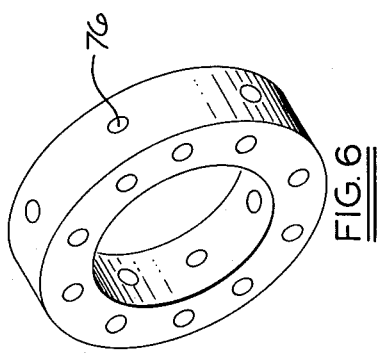
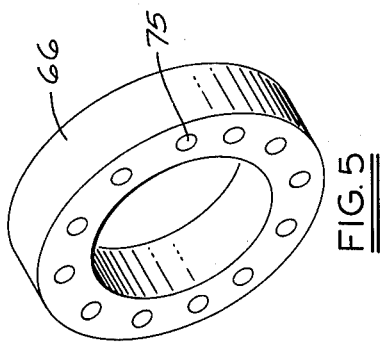
FRED OSWALD
INVENTOR.
BY *George B. Oujevolk*
ATTORNEY United States Patent Office 3,239,800
Patented Mar. 8, 1966

3,239,800
UNDERWATER ELECTRICAL EQUIPMENT
Fred Oswald, Ballston Spa, N.Y., assignor to Espey Mfg. and Electronics Corp., Saratoga Springs, N.Y., a corporation of New York
Filed Sept. 3, 1963, Ser. No. 306,141
4 Claims. (Cl. 340—8)

The present invention relates to underwater electrical equipment, and more particularly to the construction of such equipment and its components which will perform accurately when under hydrostatic pressure System and component design of this type of equipment is impaired by lack of data at profound depths. Typical of this type of equipment is the Fixed Acoustic Buoy known as FAB which was designed for the United States Navy and has been described by Richard P. Oberlin in an article "The Design and Installation of the Fixed Acoustic Buoy," and in a companion article written by R. P. Delaney entitled "Deep Transducer Design."

According to these articles, the Fixed Acoustic Buoy is a deep sea instrumentation device which measures acoustic data at a depth of 14,000 feet. It is controlled and powered from shore via a cable and has numerous modes of operation. The hydrophones used in the FAB system has also been described by Edward T. O'Neill in an article "Pressure-Balanced High-Pressure Hydrophone," in volume 34, No. 10, pages 1661–1662, Journal of the Acoustical Society of America. One of the problems involved relates to the performance of the electrical components under hydrostatic pressure and this subject also has been the subject of a technical paper by Chester L. Buchanan and Matthew Flato entitled "Influence of High Hydrostatic Pressure Environment on Electrical Components." Among the components described in the Buchanan et al. technical paper are molybdenum-nickel-iron cores, e.g., molybdenum permalloy powder metal cores often used as a toroidal core. The permalloy type toroidal core which contains about 2% molybdenum, about 8% nickel and the balance iron is well known in the art. The powder is pulverized from hot rolled plate, insulated with a binder material capable of withstanding the high temperature hydrogen anneal and the high pressure of 225,000 at which the powder is pressed into cores. These cores are commercially made in four standard permeabilities: 125, 60, 26 and 14. The 125 permeability cores are normally used at frequencies up to 15 kc.; the 60 permeability cores from 10 to 50 kc.; the 26 permeability cores from 30 to 75 kc.; and the 14 permeability cores from 50 to 200 kc. At normal pressures such cores have a constant permeability over a wide range of flux density.

When such cores are subjected to underwater pressures, e.g., pressures of the order of about 6,000 to 10,000 p.s.i. or greater, the constancy of permeability is lost. Therefore, the output from these cores when fed to other components of the system are inaccurate. Furthermore, since the factors which act on these cores are not too well understood, the results obtained are not predictable. Thus, difficulties are encountered when trying to provide FAB systems which have magnetic memories and delay lines.

Although many attempts have been made to provide powder metal molybdenum permalloy toroid cores, which will have either predictable or consistent characteristics when operating underwater at profound depths, none, as far as I am aware have proven completely successful when carried out into actual practice.

It has now been discovered that a FAB system having powder metal molybdenum permalloy toroid cores can be provided having a performance characteristic at profound depths underwater which is the same as the performance at normal pressure. Thus, the FAB system can readily be assembled above the water and placed at great depths in the water.

Thus, it is the object of the present invention to provide electronic devices useful for underwater operation wherein the performance of the components therein will not vary because of pressure.

Another object of the present invention is to provide molybdenum permalloy powder metal cores whose performance under great pressure will not vary from their performance at normal pressure.

With the foregoing and other objects in view, the invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

Figure 7:
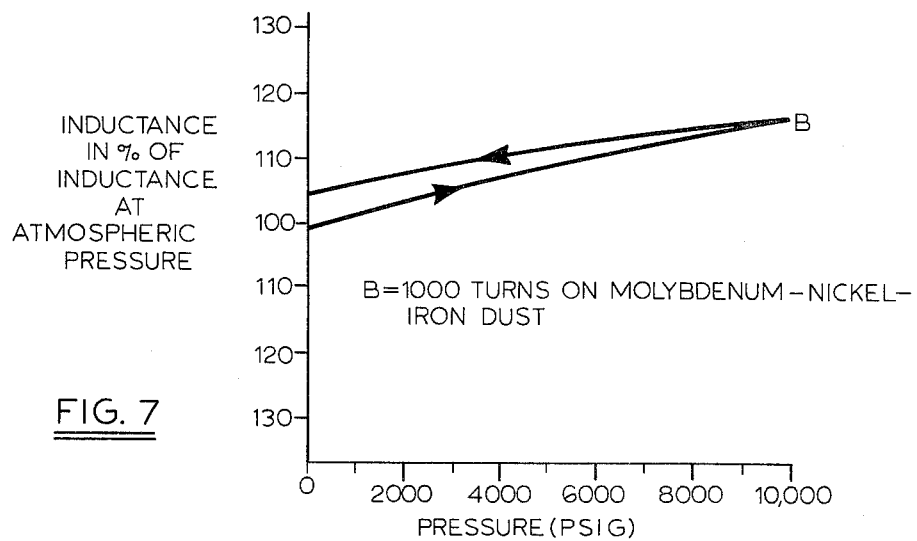
Figure 2:
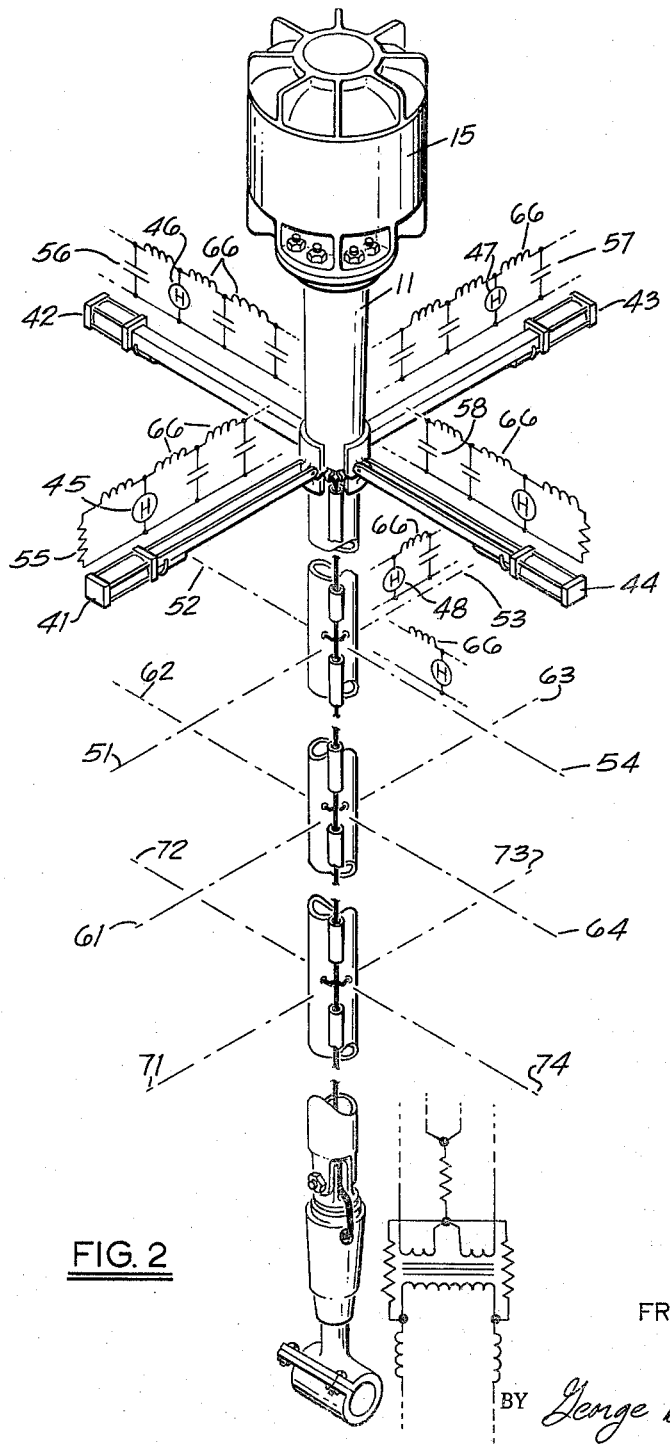
Figure 3:
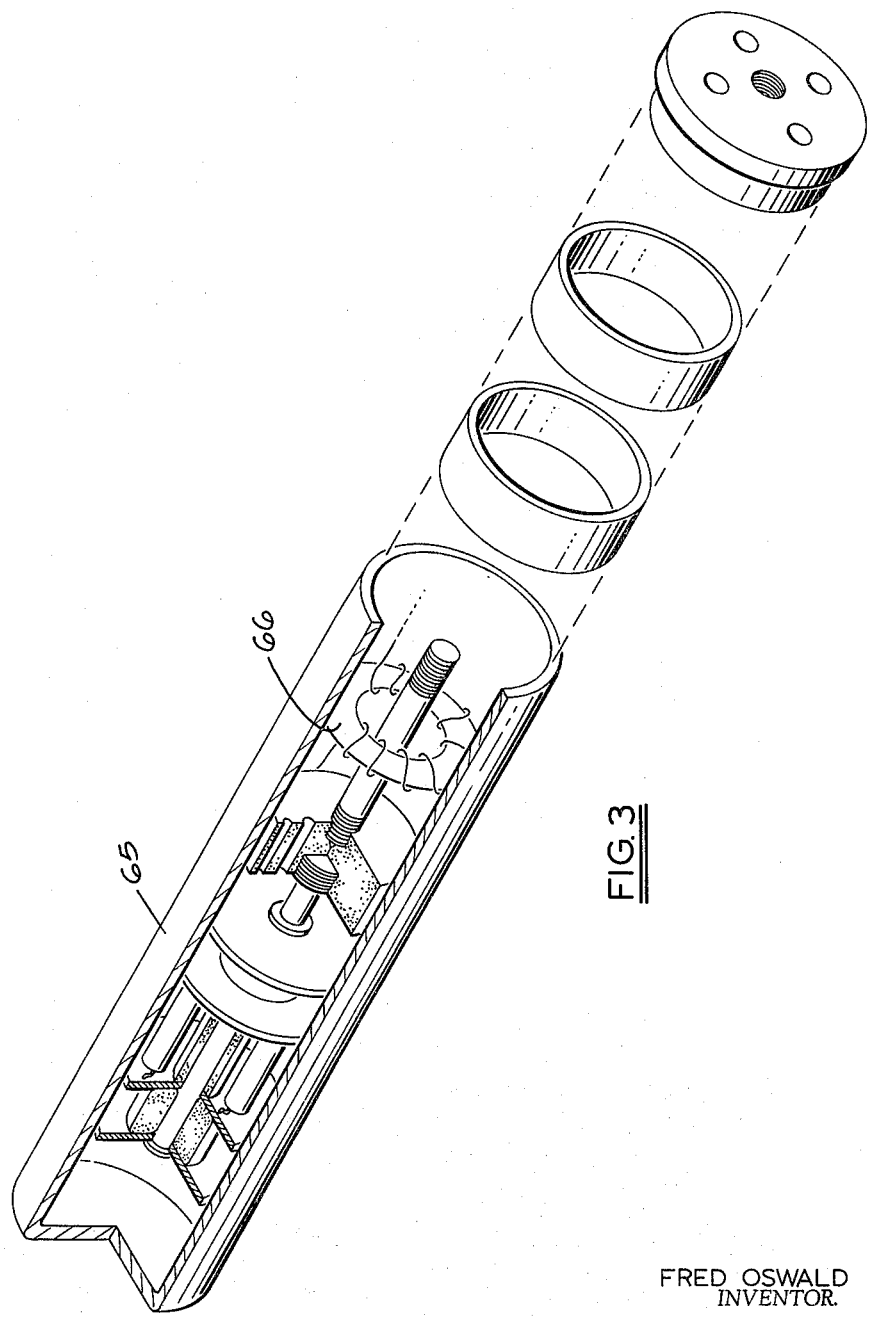

The invention will appear more clearly from the following description when taken in connection with the accompanying drawing, showing by way of example, preferred embodiments of the inventive idea, in which:

FIGURE 1 shows a typical FAB implantment;
FIGURE 2 is a perspective view of the buoy shown in the implantment of FIGURE 1 showing schematically some of the components forming delay lines;
FIGURE 3 is an exploded view of a portion of the hydrophone and components of the delay line which are a part of the buoy shown in FIGURE 2;
FIGURE 4 is a block diagram of a theoretical apparatus to illustrate in a simplified form the mathematical and physical problems relating to the FAB system;
FIGURE 5 shows a perspective view of one embodiment of a powder metal core herein contemplated;
FIGURE 6 illustrates in perspective view another embodiment of a powder metal core herein contemplated; and
FIGURE 7 depicts in graphic form the effect of pressure on the inductance of some components used in an FAB system.

The FAB system generally includes a bottom unit 11, a cable 12 and shore equipment 13. The bottom unit 11 is set in place by a cable layer ship and carried to the bottom by an anchor 14. Looking first at FIGURE 4 a theoretical bottom unit 11 is shown in block diagram as having a buoyancy tank 15 and four horizontal arms 16, 17, 18, 19, each having a hydrophone 21, 22, 23, 24 at the end thereof.

In practice, the much more complex instrument depicted in FIGURE 2 is used of course, but the principles of the complex instrument are substantially the same as those of the coarse theoretical apparatus shown in FIGURE 4, and once the principles of operation of the coarse apparatus shown in FIGURE 4 are understood, the application of these principles to the present invention will be more readily apparent.

When an underwater sound is emitted, according to the location of the sound as shown in the drawing, the sound wave will strike hydrophone 24 at a time T but it will strike hydrophone 23 at an earlier time or $T-D_{33}$; hydrophone 22 at a still earlier time or $T-D_{32}$; and hydrophone 21 at a much earlier time namely $T-D_{31}$. Without the delay lines $D_{31}$, $D_{32}$ and $D_{33}$, the underwater sound will be received at the recorder at different times creating only noise and defying proper amplification. Neglecting the electrical time delay that it takes for an electrical signal to go from the hydrophone to the recorder 20, it is at once apparent from a study of FIGURE 4 that the sound received at hydrophone 21 must be delayed a time period $D_{31}$; at hydrophone 22, a time period $D_{32}$; and at hydrophone 23, a time period $D_{33}$. In this manner the sound received from all four hydrophones reach the recorder at the same time. This not only provides amplification but also heading since obviously with a more complex device shown in FIGURE 2, a maximum signal output on the recorder can only come from one source at one location. Since according to the Buchanan et al. article, the molybdenum-nickel iron cores exhibit an inductance change of about 14% when subjected to pressure, it is readily apparent that it is impossible to properly set the delay lines to attain the desired objective.

Looking now at FIGURES 2 and 3, there is depicted a bottom unit 11 having a vertically steerable acoustic array of a first set of horizontal arms 41, 51, 61, 71, etc. A second set of horizontal arms 42, 52, 62, 72, etc., are disposed at 90° to said first set; a third set, 43, 53, 63, 73, etc., are set at 180° to said first set; and, a fourth set 44, 54, 64, 74, etc., are set at 180° to said second set. The attitude of the unit underwater is maintained by the buoyancy tank 15. Each horizontal arm has a hydrophone, i.e., 45, 46, 47, 48, furthermore, each horizontal arm has a delay line arrangement shown for the first four horizontal arms as 55, 56, 57, 58.

Each hydrophone assembly is in a housing 65 usually filled with a silicon oil. As is readily apparent from the device illustrated, the accuracy of operation depends on the permeability of the core 66 which is a powder metal molybdenum permalloy core. These cores in the delay line fix the time delay for each particular delay line. These cores are of the type hereinbefore described and coated with insulating finishes of various types for use as delay lines components.

Due to the porous nature of these powder metal cores, the hydrostatic pressure apparently causes large elastic or plastic strains causing changes in density, particle spacing and possibly local conductivity of the particles of which the core is made. To eliminate the effects of the pressure it is necessary to compensate for the pressure, e.g., if the housing is filled with silicon oil, oil should penetrate into the core so as to equalize both the internal and external pressures.

To provide the necessary compensation, e.g., to permit penetration of the non-conducting silicon oil, small holes 75 are drilled through the core material. These holes 75 are either drilled axially as shown by holes 75 or radially as shown by holes 76. A core with only axial holes is shown in FIGURE 5 while a core with both axial and radial holes is shown in FIGURE 6. Preferably the holes are symmetrically drilled.

For the purpose of giving those skilled in the art a better understanding of the invention, the following illustrative examples are given:

*Examples*

Standard purchased powder metal molybdenum permalloy cores were tested for permeability and core loss first at atmospheric pressure and then under hydraulic pressure. Holes were then drilled in these cores as illustrated in FIGURES 5 and 6 and these cores were again tested as before.

Permeability of the test core is calculated from the following formula. The inductance is measured on a sensitive bridge with a uniformly distributed winding on the core.

$$mu = \frac{(L) \times 10^9}{11.7 \left( \log_{10} \frac{O.D.}{I.D.} \right) H_e N^2}$$

where
L is measured inductance (henries)
O.D. is measured outside diameter before finish (inches)
I.D. is effective inside diameter before finish, corrected for 2° taper (inches)
$H_e$ is effective height before finish, corrected for corner radii (inches)
N is number of turns in test winding Core loss is measured by winding test cores with suitable windings, and measuring the inductance and effective resistance on a sensitive bridge. Cores of 125 permeability are tested with an 89 millihenry winding at 1800 c.p.s. at 20 gauss. Cores of 60 permeability are tested at 8000 c.p.s. at 10 gauss with a 6 millihenry winding. Cores of 26 and 14 permeability are measured with a 6 millihenry winding of Litz wire at 75 kc. at 4 gauss. The effective resistance is corrected for D.-C. resistance and skin effect to obtain the component represented by core loss alone. This value of resistance is divided by the inductance and permeability of the test core, to express the core loss in ohms per henry per unit of permeability.

Holes in the cores were drilled in 8 symmetrically spaced locations around the periphery of the core using a number 52 drill.

According to the Chester L. Buchanan et al. article, molybdenum-nickel-iron dust cores show changes in inductance of up to 14% when subjected to pressure as shown in FIGURE 7. Tests performed for the present examples provided the following results:

Test: Hydrostatic test
Equipment: Hydrostatic Test Fixture General Radio Impedance Bridge Type 1650–A

| Workpiece | Induct-ance | P.s.i. | | | | | | |
|---|---|---|---|---|---|---|---|---|
| | | 0 | 1,000 | 2,000 | 3,000 | 4,000 | 5,000 | 6,000 |
| No holes | LMH | 226 | 234 | 238 | 240.5 | 242.2 | 246.7 | 248.8 |
| | Q | 40 | 35 | 33 | 30 | 30 | 29 | 27 |
| Radial holes | LMH | 226 | 226 | 226.5 | 226.7 | 227 | 227 | 227 |
| | Q | 40 | 40 | 40 | 40 | 40 | 40 | 40 |
| Axial holes | LMH | 226 | 226 | 226 | 226.5 | 226.8 | 227.2 | 227.2 |
| | Q | 40 | 40 | 40 | 40 | 40 | 40 | 40 |

(Where LMH is the induction in millihenries).

From the foregoing tests it is readily apparent that the cores tested with no holes when subjected to hydrostatic pressure exhibited changes in inductance and Q similar to those described in the Chester L. Buchanan et al. article and depicted graphically in FIGURE 7 taken from said article whereas when the cores were treated in the manner herein described, there was substantially no change in Q or inductance.

It will be apparent to those skilled in the art, that my present invention is not limited to the specific details described above and shown in the drawing, and that various modifications are possible in carrying out the features of the invention and the operation and method of support, mounting and utilization thereof, without departing from the spirit and scope of the appended claims.

What is claimed is:
1. In an electronic underwater device including a housing and circuits therein, said device including powder metal molybdenum permalloy toroid cores, the improvement therein to provide constancy of permeability of the cores while under hydrostatic pressure consisting of cores, said cores having a plurality of holes so as to equalize internal and external pressure.

2. A device as claimed in claim 1, said holes being spaced around the periphery of the core and axially disposed.

3. A device as claimed in claim 1, said holes being spaced around the periphery of the core and being radially disposed.

4. A device as claimed in claim 1, said housing being filled with a non-conducting liquid.

References Cited by the Examiner
UNITED STATES PATENTS

| | | | |
|---|---|---|---|
| 2,802,185 | 8/1957 | Dewitz | 336—229 |
| 3,123,787 | 3/1964 | Shifrin | 336—229 |
| 3,146,393 | 8/1964 | Gibbon | 336—229 |

CHESTER L. JUSTIS, *Primary Examiner.*

GERALD M. FISHER, *Assistant Examiner.*